United States Patent
Komiyama

(10) Patent No.: US 12,225,287 B2
(45) Date of Patent: Feb. 11, 2025

(54) CAMERA CONTROL APPARATUS CAPABLE OF ACQUIRING IMAGES FROM A PLURALITY OF CAMERAS AND PERFORMING IMAGE-CAPTURING

(71) Applicant: CANON KABUSHIKI KAISHA, Tokyo (JP)

(72) Inventor: Mai Komiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 254 days.

(21) Appl. No.: 17/747,834

(22) Filed: May 18, 2022

(65) Prior Publication Data
US 2022/0377237 A1    Nov. 24, 2022

(30) Foreign Application Priority Data
May 21, 2021   (JP) .................. 2021-085776

(51) Int. Cl.
*H04N 23/667* (2023.01)
*H04N 23/66* (2023.01)
*H04N 23/90* (2023.01)

(52) U.S. Cl.
CPC .......... *H04N 23/667* (2023.01); *H04N 23/66* (2023.01); *H04N 23/90* (2023.01)

(58) Field of Classification Search
CPC ...... H04N 23/667; H04N 23/66; H04N 23/90; H04N 23/64; H04N 23/69; H04N 23/695; H04N 23/661
See application file for complete search history.

(56) References Cited

U.S. PATENT DOCUMENTS 11,284,019 B1 * 3/2022 Straley .............. H04N 21/4316

FOREIGN PATENT DOCUMENTS

JP        2007158860 A      6/2007

* cited by examiner

*Primary Examiner* — Christopher K Peterson
(74) *Attorney, Agent, or Firm* — Canon U.S.A., Inc. IP Division

(57) ABSTRACT

A control apparatus that acquires images from a plurality of cameras performing automatic image-capturing includes a status acquisition unit that acquires an automatic image-capturing status of each of the plurality of cameras, the automatic image-capturing status including information about a current automatic image-capturing target, a recommended camera identification unit that identifies, based on the acquired automatic image-capturing status, a camera from among the plurality of cameras for which manual image-capturing is recommended, and a notification control unit configured to perform control to provide notification a result of the identification by the recommended camera identification unit.

9 Claims, 9 Drawing Sheets

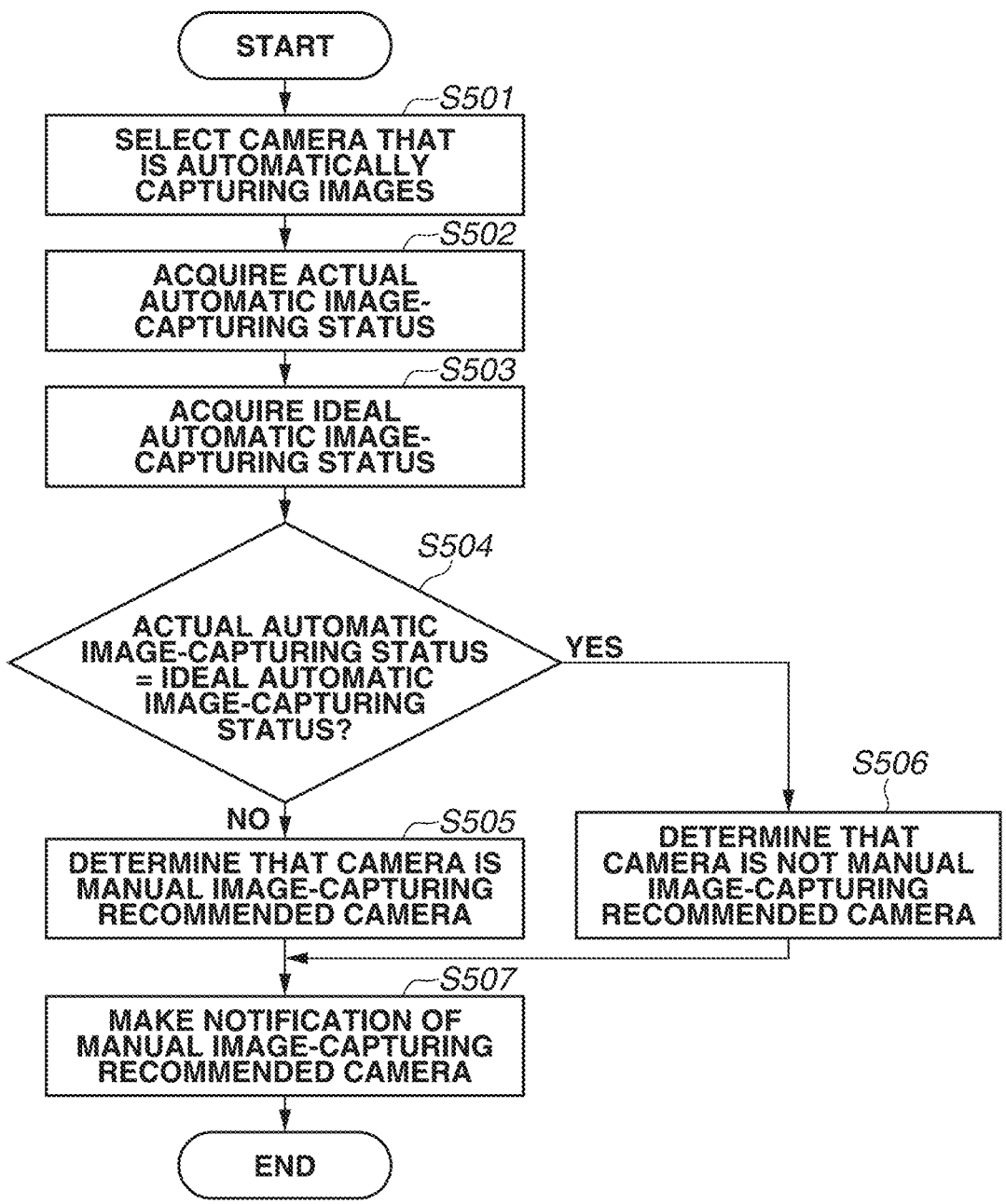

| CAMERA | TRACKED SUBJECT | DEGREE OF IMPORTANCE OF SUBJECT (MIN: 1 to MAX: 10) | RESULT OF DETERMINATION ON MANUAL IMAGE-CAPTURING RECOMMENDED CAMERA | RECOMMENDATION PRIORITY |
|---|---|---|---|---|
| CAMERA 1 | A | 1 | YES (RECOMMENDED) | 2 |
| CAMERA 2 | B | 5 | NO (NOT RECOMMENDED) | — |
| CAMERA 3 | C | 10 | YES (RECOMMENDED) | 1 |
| CAMERA 4 | D | 10 | NO (NOT RECOMMENDED) | — |
| CAMERA 5 | D | 10 | YES (RECOMMENDED) | 3 |
| CAMERA 6 | E | 6 | NO (NOT RECOMMENDED) | — |

801

CAMERA CONTROL APPARATUS CAPABLE OF ACQUIRING IMAGES FROM A PLURALITY OF CAMERAS AND PERFORMING IMAGE-CAPTURING

BACKGROUND

Field

The present disclosure relates to a camera control apparatus.

Description of the Related Art

An image-capturing system is known that automatically selects and utilizes captured images transmitted to a network communication path from a plurality of image-capturing apparatuses that performs automatic image-capturing (refer to Japanese Patent Application Laid-Open No.2007-158860).

SUMMARY

To enable switching to manual image-capturing depending on an automatic image-capturing status of a camera that is performing automatic image-capturing, according to an aspect of the present disclosure, a control apparatus configured to acquire images from a plurality of cameras performing automatic image-capturing includes a status acquisition unit configured to acquire an automatic image-capturing status of each of the plurality of cameras, the automatic image-capturing status including information about a current automatic image-capturing target, a recommended camera identification unit configured to identify, based on the acquired automatic image-capturing status, a camera from among the plurality of cameras for which manual image-capturing is recommended, and a notification control unit configured to perform control to provide notification based on a result of the identification by the recommended camera identification unit.

Further features will become apparent from the following description of exemplary embodiments with reference to the attached drawings.

BRIEF DESCRIPTION OF THE DRAWINGS

FIG. 5 is a flowchart illustrating an example of processing of the multi-camera control apparatus.

DESCRIPTION OF THE EMBODIMENTS

Figure 1:
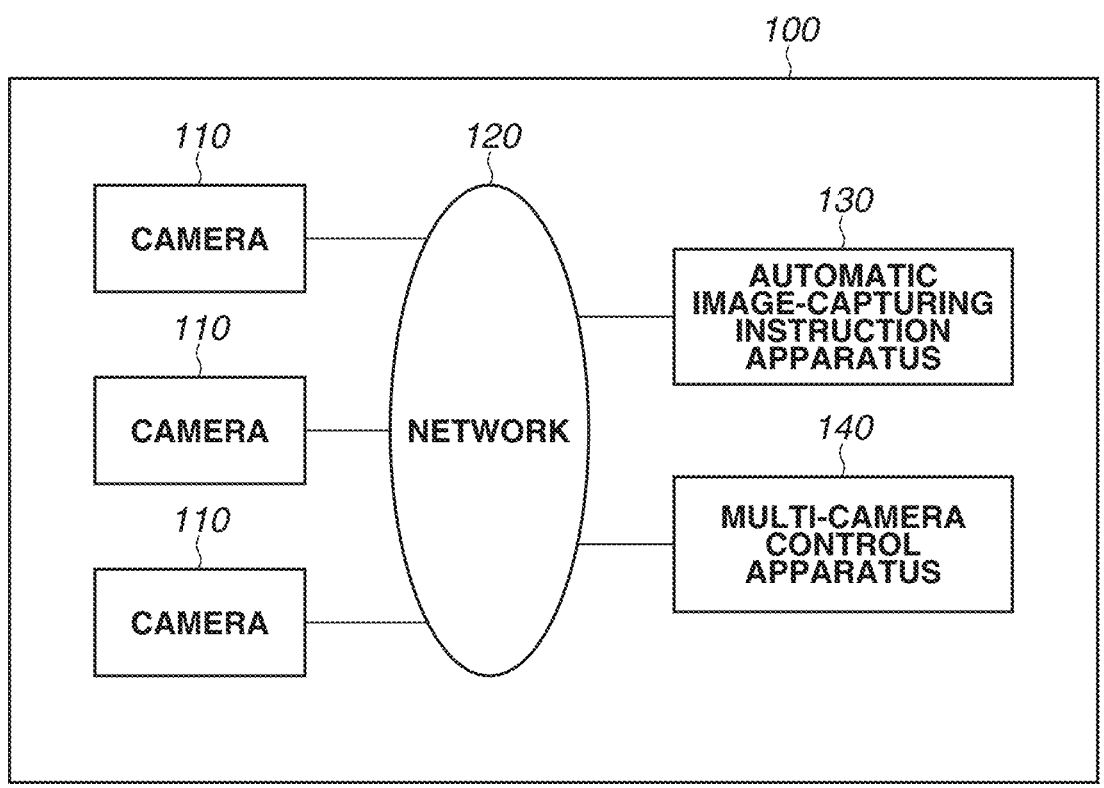
FIG. 1 is a block diagram illustrating a configuration of an image-capturing system.

FIG. 1 is a block diagram illustrating a configuration of an image-capturing system 100 according to a first exemplary embodiment. In the image-capturing system 100, a plurality of cameras 110 is connected to a network 120, while an automatic image-capturing instruction apparatus 130 and a multi-camera control apparatus 140 are connected to the network 120.

Figure 2:
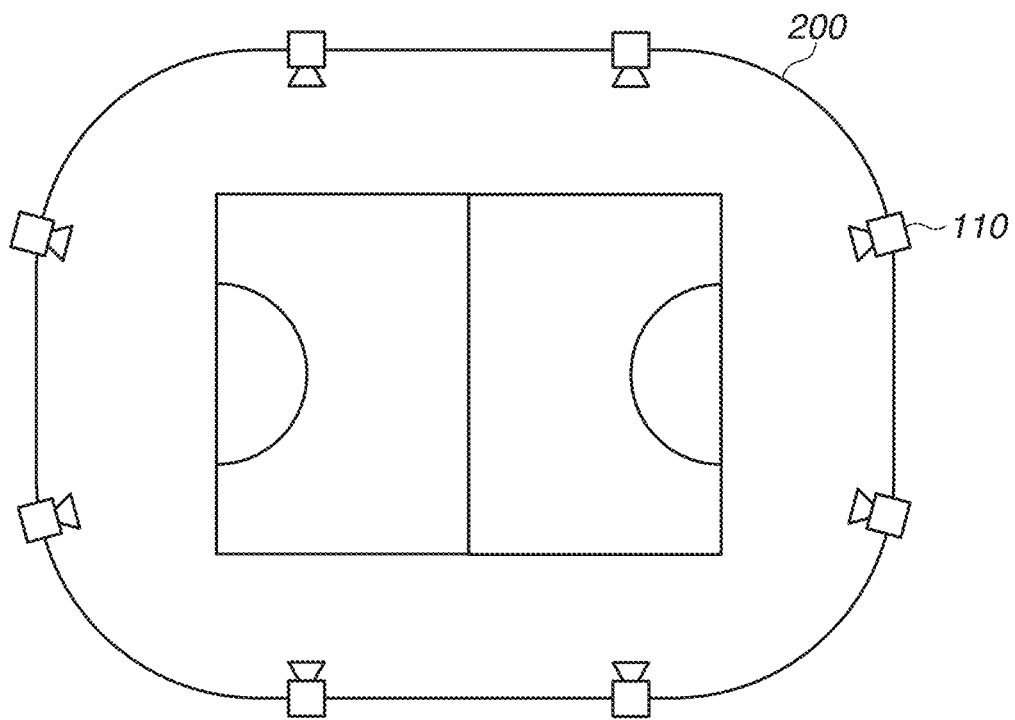
FIG. 2 is a diagram illustrating an installation example of a camera.

The plurality of cameras 110 is, as illustrated in FIG. 2, installed at respective different positions to surround an image-capturing region 200, and captures images of the image-capturing region 200. The image-capturing region 200 in the present exemplary embodiment is a soccer field, and an example of automatically capturing images of a soccer match will be described. The image-capturing region 200 is not limited to the present example, and can be any venue where images are captured, such as a stadium where different sporting events are held, a stage where a theatrical play is performed, a shooting studio, etc.

The plurality of cameras 110 are network cameras that can be remotely controlled by the multi-camera control apparatus 140 via the network 120. The plurality of cameras 110 can each be interchangeably referred to as "camera 110". Each camera 110 performs pan/tilt/zoom (PTZ) control based on a movement of a subject in response to an instruction for automatic image-capturing from the automatic image-capturing instruction apparatus 130 to serve an automatic image-capturing function such as a tracking and image-capturing function. The camera 110, for example, identifies a subject by identification of a uniform number of the subject or face authentication, and perform PTZ control so that a specified subject is always seen at an identical position in an image (for example, in the middle of a screen) in an identical size (for example, an image above the chest is captured).

The camera 110 transmits information regarding captured image data and an automatic image-capturing status in response to a request from the automatic image-capturing instruction apparatus 130 or the multi-camera control apparatus 140.

While the camera 110 is described as a camera that has the automatic image-capturing function in the present exemplary embodiment, a configuration in which an automatic image-capturing apparatus that detects the subject from captured images and issues a PTZ control instruction is externally arranged can be employed.

The plurality of cameras 110 can include, other than a camera having the automatic image-capturing function implemented by the PTZ control, one or more cameras fixed as bird's-eye view cameras that always capture the entire or part of the image-capturing region 200. In this case, transmitting data of images captured by the bird's-eye view camera(s) to the automatic image-capturing instruction apparatus 130 enables the automatic image-capturing instruction apparatus 130 to grasp a situation of the image-capturing region 200 and issue the instruction for automatic image-capturing to the camera that performs automatic image-capturing.

The network 120 is a network that connects the plurality of cameras 110, the automatic image-capturing instruction apparatus 130, and the multi-camera control apparatus 140. The network 120 is, for example, implemented by a plurality of routers, a plurality of switches, a plurality of cables, and the like conforming to a communication standard such as Ethernet®. Alternatively, the network 120 can be implemented by the Internet, a wired local area network (LAN), a wireless LAN, a wide area network (WAN), or the like.

The automatic image-capturing instruction apparatus 130 is, for example, a personal computer (PC) and a server apparatus, and has an image analysis function and an image-capturing determination function. The automatic image-capturing instruction apparatus 130 analyzes images captured by the bird's-eye view camera(s) from among the plurality of cameras 110. With this configuration, in a case of a soccer match, the automatic image-capturing instruction apparatus 130 analyzes the match based on positions and movements of players, and determines how to capture images. The automatic image-capturing instruction apparatus 130 then issues the instruction for automatic image-capturing to a camera for automatic image-capturing, from among the plurality of cameras 110. Additionally, in response to a request from the multi-camera control apparatus 140, the automatic image-capturing instruction apparatus 130 provides notification of an automatic image-capturing policy including an analysis result and a content of the determined instruction for automatic image-capturing to the camera 110.

The instruction for automatic image-capturing to the camera 110 is, for example, an instruction for subject tracking that designates a player near a goal in a sequence when a player is about to score a goal, and is issued to the plurality of cameras 110 to perform the subject tracking on respective different players. The automatic image-capturing instruction apparatus 130 also, as an instruction for an image capturing composition, issues an instruction for capturing close-up images of players, images above the chest of players, or images of the entire body of players in the center of the screen. In a case where the subject is determined as an important subject, such as a player who is in possession of the ball, the automatic image-capturing instruction apparatus 130 can instruct the plurality of cameras 110 to perform tracking and image capturing of the same player. A determination method and a content of the instruction are not limited thereto.

The multi-camera control apparatus 140 is a client terminal that includes a display unit, such as a display of the PC and a tablet terminal, and an operation unit that accepts a user operation, such as a mouse, a keyboard, a touch panel, or a joystick. A joystick is preferable to implement smooth PTZ operations, but control can be performed via a graphical user interface (GUI) on an application. The multi-camera control apparatus 140 performs remote control to perform PTZ control of a selected camera 110 while displaying images captured by the plurality of cameras 110.

The configuration of the image-capturing system 100 is not limited to that illustrated in FIG. 1. For example, a plurality of multi-camera control apparatuses 140 can be connected to the network 120, or the automatic image-capturing instruction apparatus 130 and the multi-camera control apparatus 140 can be implemented by the same PC.

Figure 3:
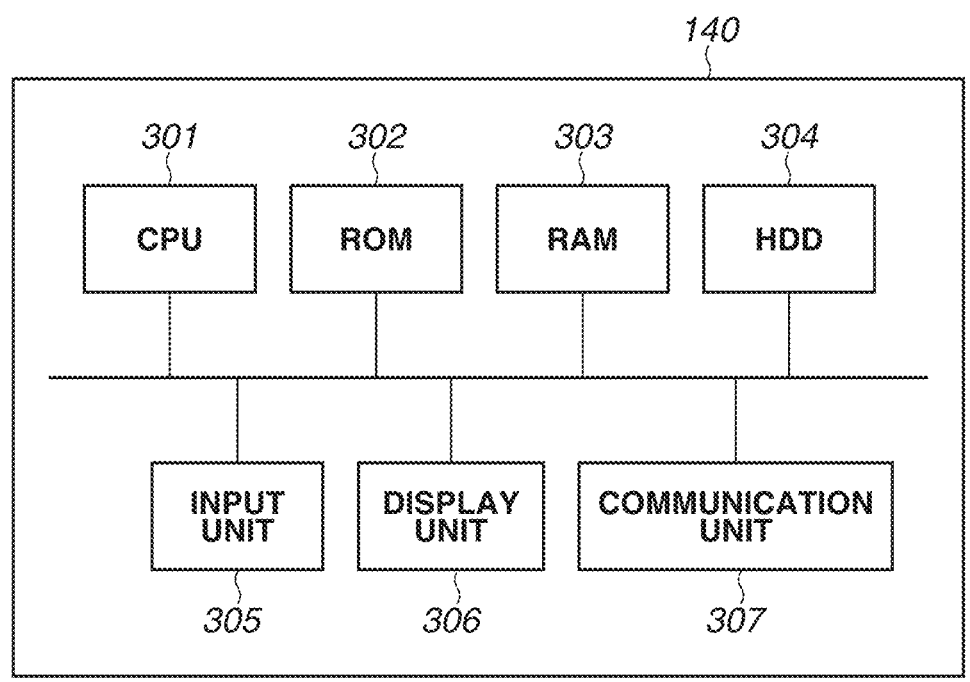
FIG. 3 is a diagram illustrating a hardware configuration example of a multi-camera control apparatus.

FIG. 3 is a diagram illustrating a hardware configuration example of the multi-camera control apparatus 140. The multi-camera control apparatus 140 includes a central processing unit (CPU) 301, a read-only memory (ROM) 302, a random-access memory (RAM) 303, a hard disk drive (HDD) 304, an input unit 305, a display unit 306, and a communication unit 307.

The CPU 301 executes computation processing and various kinds of programs using a control program stored in the ROM 302 or the HDD 304, and thereby implements various kinds of functions of the multi-camera control apparatus 140. The ROM 302 has a storage area in which a boot program, a control program, a parameter set to each unit of the multi-camera control apparatus 140, and the like are stored. The RAM 303 is used as a temporary storage area such as a main memory and work area of the CPU 301. The HDD 304 stores various kinds of data and a program. Alternatively, another auxiliary memory device such as a solid state drive (SSD) can be used instead of the HDD 304.

The input unit 305 includes, for example, a keyboard, a mouse, a joystick, and/or a touch panel, and inputs various kinds of instructions to the CPU 301 in response to operations from a user. The display unit 306 includes, for example, a liquid crystal display or a light emitting diode (LED), and displays a GUI or the like, via which the user operates the multi-camera control apparatus 140. The CPU 301 operates as a display control unit that controls the display unit 306. The communication unit 307 executes processing of communication with an external apparatus such as the camera 110 and the automatic image-capturing instruction apparatus 130 via the network 120. In the present exemplary embodiment, the display unit 306 and the input unit 305 are located inside the multi-camera control apparatus 140. In another exemplary embodiment, at least one the display unit 306 or the input unit 305 can be another apparatus external to the multi-camera control apparatus 140.

Figure 4:
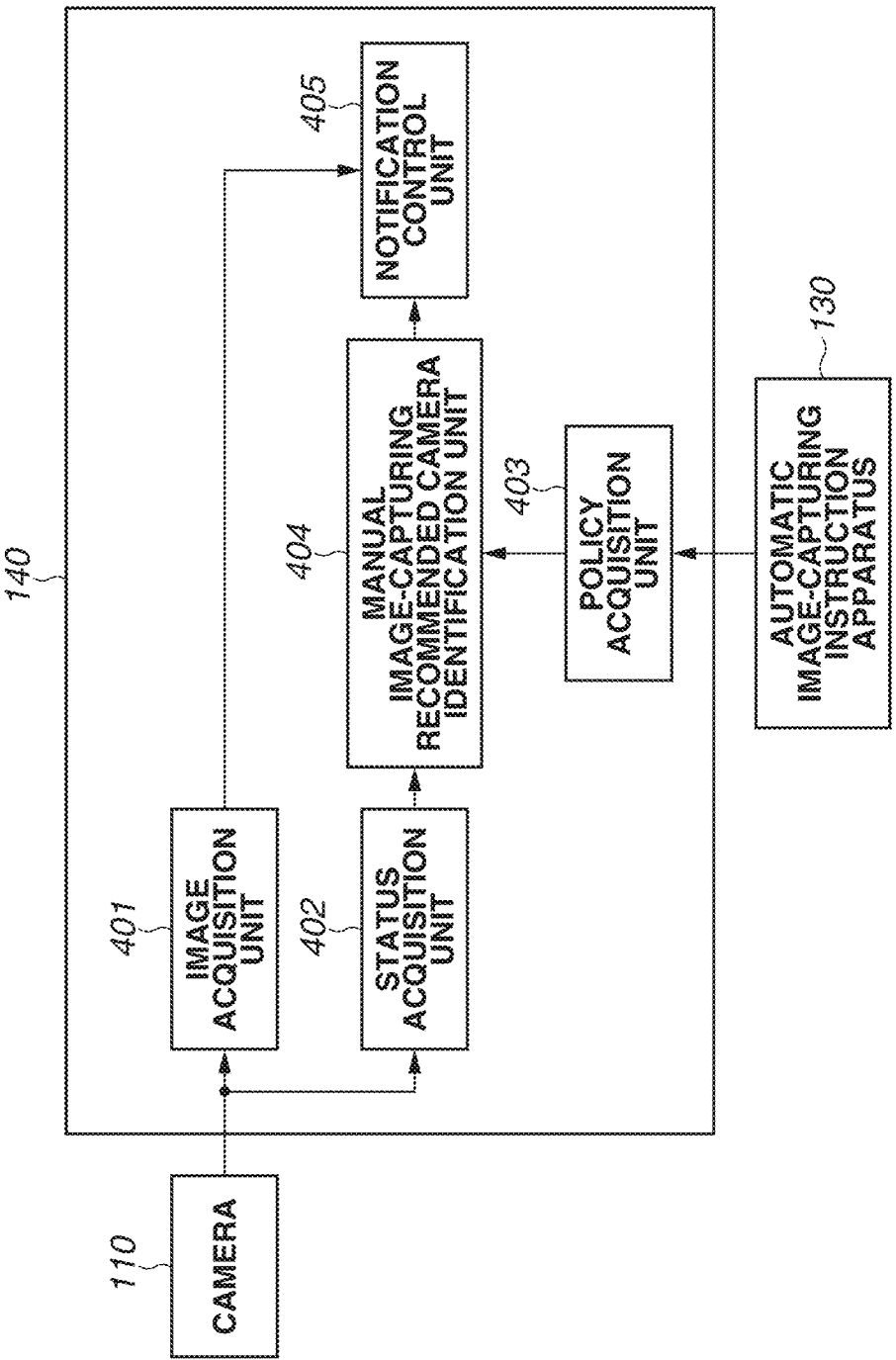
FIG. 4 is a diagram illustrating a functional configuration example of the multi-camera control apparatus.

FIG. 4 is a block diagram illustrating a functional configuration of the multi-camera control apparatus 140 according to the present exemplary embodiment.

An image acquisition unit 401 receives captured image data from the camera 110 and transmits the captured image data to a notification control unit 405.

A status acquisition unit 402 receives a current automatic image-capturing status from the camera 110 and transmits the current automatic image-capturing status to a manual image-capturing recommended camera identification unit 404. The automatic image-capturing status in the present exemplary embodiment includes, when the camera 110 is performing tracking and image-capturing of a subject, information indicating whether the camera 110 is tracking the target subject, information regarding the tracked subject, and information regarding an image-capturing composition (hereinafter referred to as an actual automatic image-capturing status).

A policy acquisition unit 403 acquires an automatic image-capturing policy in the image-capturing system 100 from the automatic image-capturing instruction apparatus 130 and transmits the automatic image-capturing policy to the manual image-capturing recommended camera identification unit 404. The automatic image-capturing policy in the present exemplary embodiment includes information regarding the tracked subject, which is a target of automatic image-capturing instructed to each of the plurality of cameras 110, and information regarding the image-capturing composition (hereinafter referred to as an ideal automatic image-capturing status).

The manual image-capturing recommended camera identification unit 404 compares, with respect to each of the plurality of cameras 110, the actual automatic image-capturing status received from the status acquisition unit 402 and the ideal automatic image-capturing status (predetermined image-capturing status) received from the policy acquisition unit 403. With this processing, the manual image-capturing recommended camera identification unit 404 identifies a camera for which manual image-capturing is recommended, and notifies the notification control unit 405 of identified camera information (identification result).

The notification control unit 405 performs the following control based on manual image-capturing recommended camera information received from the manual image-capturing recommended camera identification unit 404. That is, the notification control unit 405 generates an image for notifying the user of a manual image-capturing recommended camera, together with captured image data of the camera 110 received from the image acquisition unit 401. The notification control unit 405 then displays the generated image on the display unit 306.

Next, the processing flow for the multi-camera control apparatus 140 according to the present exemplary embodiment to perform identification and notification of the manual image-capturing recommended camera based on the automatic image-capturing status will be described with reference to FIG. 5.

In step S501, the status acquisition unit 402 selects a camera that is performing automatic image-capturing from the plurality of cameras 110. In step S502, the status acquisition unit 402 acquires the actual automatic image-capturing status of the camera selected in step S501.

In step S503, the policy acquisition unit 403 acquires the ideal automatic image-capturing status of the camera selected in step S501 from the automatic image-capturing instruction apparatus 130.

Figure 6A:
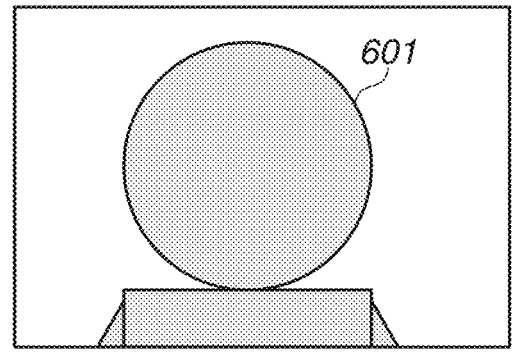
FIGS. 6A to 6C are diagrams each illustrating an example of a difference between an ideal image-capturing status and a current image-capturing status.
Figure 6B:
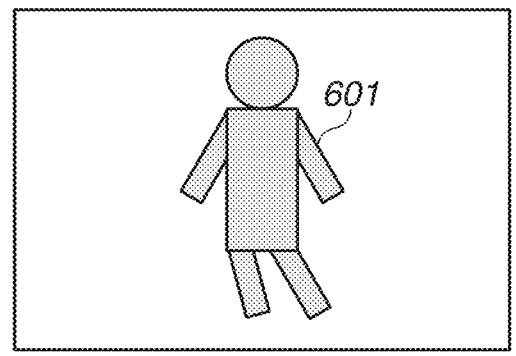
Figure 6C:
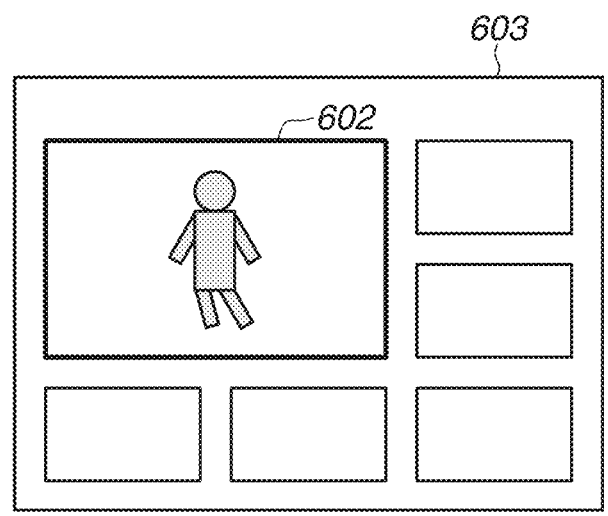

FIGS. 6A to 6C are diagrams for describing the ideal automatic image-capturing status and the actual automatic image-capturing status. FIG. 6A illustrates an example of a captured image intended by the ideal automatic image-capturing status acquired in step S503, and indicates that the automatic image-capturing instruction apparatus 130 provides an instruction for performing tracking and image-capturing while capturing close-up images of a subject 601. FIG. 6B illustrates an example of a captured image in the actual automatic image-capturing status acquired in step S502, and indicates that the camera 110 performs tracking and image-capturing while capturing the images of the entire body of the subject 601. The examples illustrated in FIGS. 6A and 6B indicate that the camera 110 is in a state of having received an instruction for performing tracking and capturing of close-up images, but changing the image-capturing composition to perform executable tracking and capturing of images of the entire body, due to restrictions on an automatic image-capturing function, such as a detected size on a screen and tracking speed.

In step S504, the manual image-capturing recommended camera identification unit 404 compares the actual automatic image-capturing status acquired in step S502 and the ideal automatic image-capturing status acquired in step S503, and determines whether the actual automatic image-capturing status is equal to the ideal automatic image-capturing status.

In the examples illustrated in FIGS. 6A and 6B, the manual image-capturing recommended camera identification unit 404 determines that the camera 110 is tracking and image-capturing the subject 601, but the image-capturing composition is not in the ideal automatic image-capturing status.

In a case where the manual image-capturing recommended camera identification unit 404 determines that the actual automatic image-capturing status is not equal to the ideal automatic image-capturing status (NO in step S504), the processing proceeds to step S505. In step S505, the manual image-capturing recommended camera identification unit 404 determines that the camera 110 being selected is the manual image-capturing recommended camera.

In a case where the manual image-capturing recommended camera identification unit 404 determines that the actual automatic image-capturing status is equal to the ideal automatic image-capturing status (YES in step S504), the processing proceeds to step S506. In step S506, the manual image-capturing recommended camera identification unit 404 determines that the camera 110 being selected is not the manual image-capturing recommended camera.

In step S507, the notification control unit 405 generates a screen to notify the user that the camera determined as the manual image-capturing recommended camera in step S505 is the manual image-capturing recommended camera, and displays the screen on the display unit 306. FIG. 6C illustrates an example of a screen 603 to be displayed on the display unit 306 when the notification of a manual image-capturing recommended camera 602 is made in step S507. The screen 603 is an example of a screen on which a layout is changed to increase a display size of the manual image-capturing recommended camera 602, whereby notification is made to the user. A notification method is not limited thereto, and can be a method of providing notification using a coloring scheme or a message, a method of not displaying captured images of a non-recommended camera, or a method of graying-out certain portions of the display.

The above-mentioned processing flow enables notification of a camera that is not in the ideal automatic image-capturing status as the manual image-capturing recommended camera to the user.

The processing flow illustrated in FIG. 5 can be executed to notify the user of the manual image-capturing recommended camera when the user selects a manual image-capturing mode, or can be executed to notify the user of the manual image-capturing recommended camera at any time. Since the manual image-capturing recommended camera can vary over time depending on an image-capturing status, identification and notification of the manual image-capturing recommended camera can be made/performed on a frame-by-frame basis or on a several frames-by-several frames basis.

Notification of another manual image-capturing recommended camera can also be made when the user has already been performing manual image-capturing, or notification of another manual image-capturing recommended camera can be made after a camera that is performing manual image-capturing becomes capable of performing automatic image-capturing.

Alternatively, identification and notification of the manual image-capturing recommended camera can be made/performed targeting just some cameras based on selection by the user, or targeting all cameras performing automatic image-capturing. Notification can also be made after completion of identification of the manual image-capturing recommended camera for all target cameras, or can be made individually when a camera is identified as the manual image-capturing recommended camera.

The above-described exemplary embodiment provided of an example of determining a camera as the manual image-capturing recommended camera when there is even a little difference between the image-capturing composition of the actual image-capturing status and that of the ideal image-capturing status. In another exemplary embodiment, determination can be made solely on whether the camera 110 is tracking a target subject. In this case, since the camera 110 illustrated in the example of FIGS. 6A and 6B is tracking and image-capturing the instructed subject 601, the camera 110 is not determined as the manual image-capturing recommended camera. In another exemplary embodiment, a camera can be determined as the manual image-capturing recommended camera in a case where an amount of difference in image-capturing composition is a greater than or equal to a predetermined amount, or in a case where tracking and image-capturing cannot be performed for a predetermined number of frames.

A second exemplary embodiment will now be described in detail with reference to the drawings.

In the second exemplary embodiment, a description will be provided of an example of notifying the user of cameras identified as manual image-capturing recommended cameras to which priorities are added.

Figure 7:
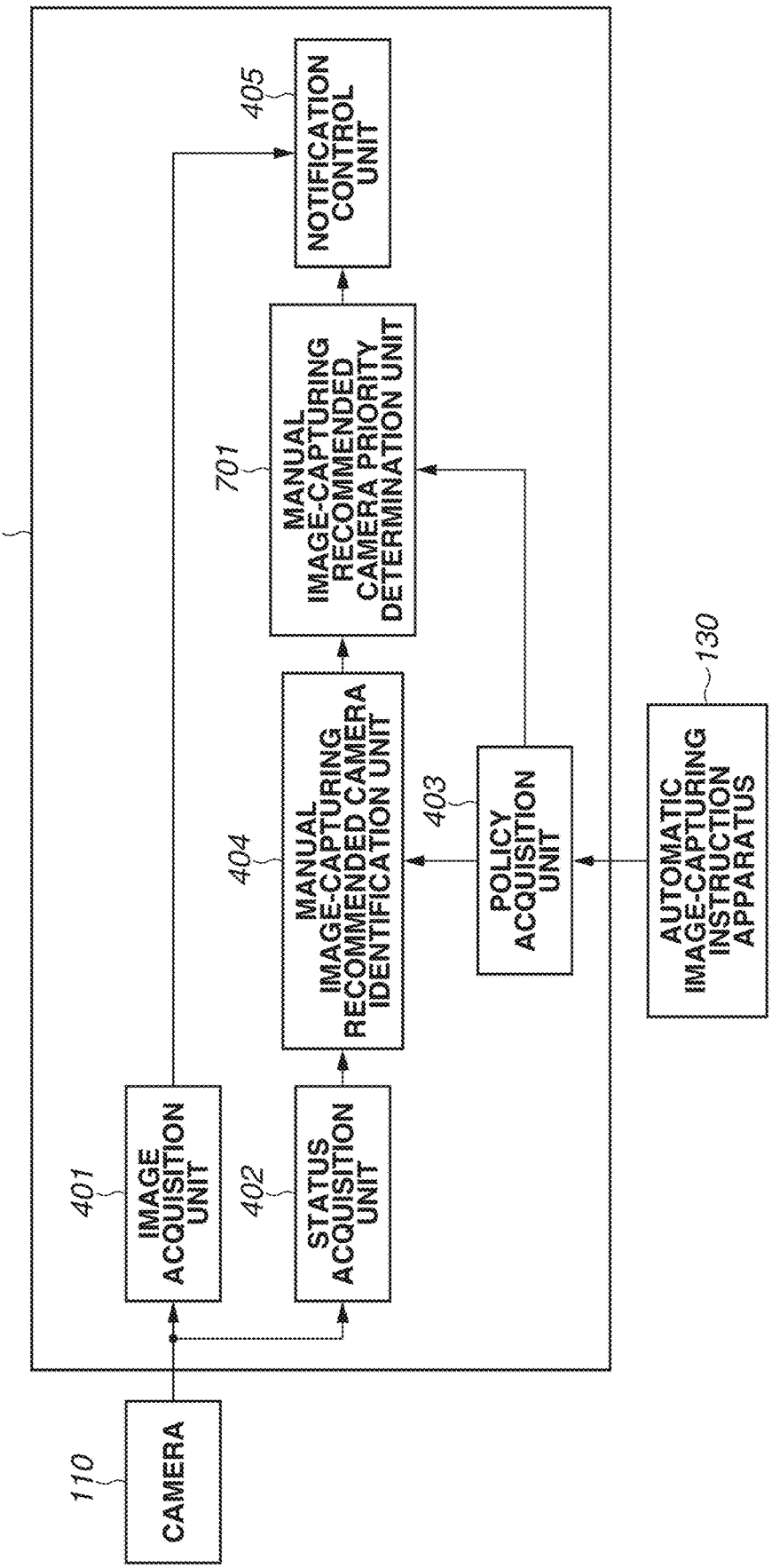
FIG. 7 is a diagram illustrating a functional configuration example of a multi-camera control apparatus.

In FIG. 7, a component that performs processing identical to that of the multi-camera control apparatus 140 illustrated in FIG. 4 is denoted by an identical reference number, and only a difference from the first exemplary embodiment will be described.

A manual image-capturing recommended camera priority determination unit 701 receives manual image-capturing identified camera information from the manual image-capturing recommended camera identification unit 404, and acquires an automatic image-capturing overall policy from the policy acquisition unit 403. The manual image-capturing recommended camera priority determination unit 701 then determines a priority of a manual image-capturing identified camera based on the automatic image-capturing overall policy, and notifies the notification control unit 405 of the priority. The automatic image-capturing overall policy in the present exemplary embodiment is information based on which respective roles and degrees of importance of the plurality of cameras 110 can be determined, such as tracked target subject information and a degree of importance of the subject in the plurality of cameras 110.

Figures 8A, 8B:
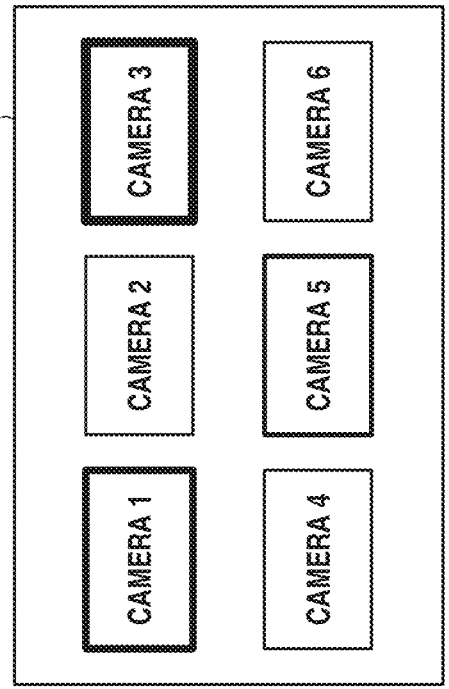
FIGS. 8A and 8B are diagrams each illustrating an example of a priority of a manual image-capturing recommended camera.

FIG. 8A is a table illustrating an example of determining a priority in the manual image-capturing recommended camera priority determination unit 701. FIG. 8A illustrates an example, for each of the plurality of cameras 110, of a correspondence among a tracked subject, a degree of importance of a subject, a result of determination on a manual image-capturing recommended camera, and a recommendation priority determined based on this information.

In the example illustrated in FIG. 8A, there are three cameras, cameras 1, 3, and 5, that are identified as cameras for which manual image-capturing is recommended due to failure of tracking or a difference in image-capturing composition, and the manual image-capturing recommended camera priority determination unit 701 first determines priorities of these three cameras.

In this example, the manual image-capturing recommended camera priority determination unit 701 determines that the camera 5, which is tracking a subject overlapping with that tracked by another camera (camera 4), has the lowest priority, and determines that the camera 3, which is tracking a subject having the highest degree of importance has the highest priority from among the remaining two cameras.

A priority determination criterion is not limited to the above-described example, and the camera 5, which is tracking the subject overlapping with that tracked by another camera, and the camera 1, which is tracking a subject having a low degree of importance, can be determined to either have an identical priority or the degree of importance of the subject can be prioritized. A reason why the camera is identified as the manual image-capturing recommended camera, whether failure of tracking or a difference in image-capturing composition, can be added to the priority determination criteria.

The priority determination criteria can be pre-set or a priority can automatically be determined.

FIG. 8B illustrates an example of a screen 801 subjected to display control by the notification control unit 405 regarding the priority of the manual image-capturing recommended camera, which is determined by the manual image-capturing recommended camera priority determination unit 701 and illustrated in FIG. 8A.

The screen 801 is an example of a screen on which the priority of the manual image-capturing recommended camera is indicated by a thickness of a frame. In another exemplary embodiment, a method of providing notification of only one camera having the highest priority can be provided. In yet another exemplary embodiment, a method of changing a size or layout of a captured image of each camera on the screen 801 depending on a priority can be provided.

The above-described exemplary embodiment(s) enables notifying the user of the manual image-capturing recommended camera to which a priority is added.

A third exemplary embodiment will now be described in detail with reference to the drawings.

In the third exemplary embodiment, a description will be provided of an example of identifying the manual image-capturing recommended camera based on determination of a scene of the image-capturing region 200.

Figure 9:
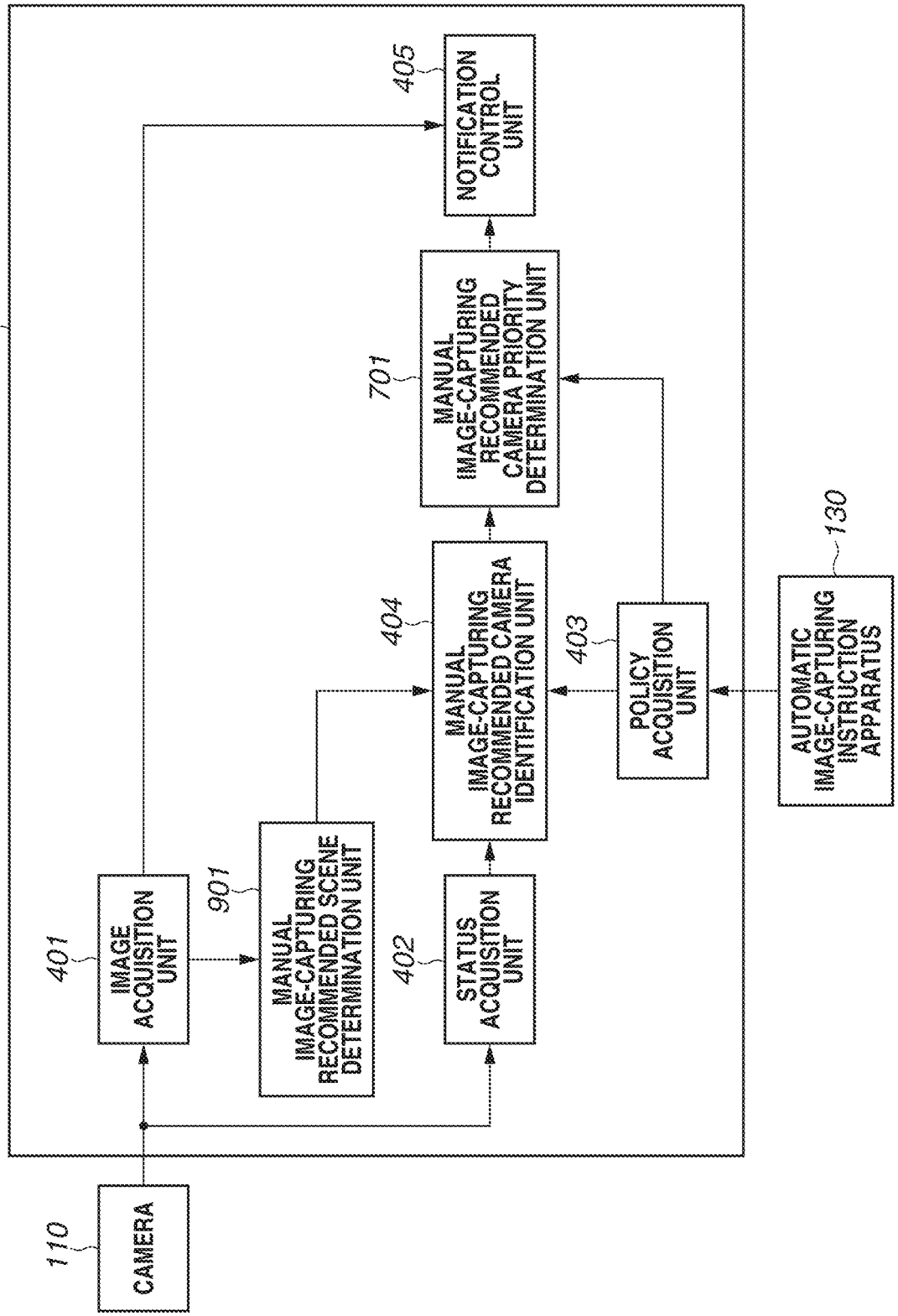
FIG. 9 is a diagram illustrating a functional configuration example of a multi-camera control apparatus.

In FIG. 9, a component that performs processing identical to that of the multi-camera control apparatus 140 illustrated in FIGS. 4 and 7 is denoted by an identical reference number, and only a difference from the first and second exemplary embodiments will be described.

A manual image-capturing recommended scene determination unit 901 acquires captured images of the plurality of cameras 110 via the image acquisition unit 401, recognizes a situation of the image-capturing region 200 based on a video, identifies a scene for which manual image-capturing is recommended, and notifies the manual image-capturing recommended camera identification unit 404 of the scene.

The scene for which manual image-capturing is recommended is pre-set. For example, in a case where a soccer match is being held in the image-capturing region 200, presume that a scene where automatic image-capturing with a fixed image-capturing composition is not effective, such as a corner kick scene, a free kick scene, or a penalty kick scene, is considered a manual image-capturing recommended scene. Which scene is the manual image-capturing recommended scene can also be determined based on a scene where manual image-capturing has previously been performed, or whether to perform manual image-capturing can be selected by the user by presentation of a result of scene determination to the user.

When the manual image-capturing recommended scene determination unit 901 determines a situation of the image-capturing region 200, videos of bird's-eye view camera(s) that capture images of the image-capturing region 200, if included in the plurality of cameras 110, are used. In a case where there is no bird's-eye view camera, videos of cameras that are performing automatic image-capturing can be used, and the configuration is not limited thereto.

The manual image-capturing recommended camera identification unit 404 then determines a camera that is capturing images of the manual image-capturing recommended scene notified by the manual image-capturing recommended scene determination unit 901 based on each camera's automatic image-capturing target acquired from the status acquisition unit 402 or the policy acquisition unit 403. The manual image-capturing recommended camera identification unit 404 then identifies the camera as the manual image-capturing recommended camera. For example, if the manual image-capturing recommended scene is a corner kick scene, a camera that is tracking a player who kicks the ball is identified as the manual image-capturing recommended camera.

The above-described exemplary embodiment enables identification of the manual image-capturing recommended camera based on determination on the scene of the image-capturing target.

In another exemplary embodiment, the above-described multi-camera control apparatus 140 can also support a case where the user wishes to perform manual image-capturing according to the user's desire instead of being done in conjunction with automatic image-capturing, which is differs from following automatic image-capturing as described in the first to third exemplary embodiments. In this case, a camera that is influenced as less as possible even if automatic image-capturing is interrupted, such as when a plurality of cameras is simultaneously tracking a subject and when the camera is tracking a subject having a low degree of importance, is notified as the manual image-capturing recommended camera, based on the automatic image-capturing policy acquired from the policy acquisition unit 403 and the imaging target of each camera.

A condition for identifying a camera in the manual image-capturing recommended camera identification unit 404 or a criterion of determination of the manual image-capturing recommended camera priority determination unit 701 can be switched depending on a purpose of performing manual image-capturing. In this case, the purpose can be selected by the user, can be determined based on user identification, or can be estimated depending on determination of a situation of the image-capturing region 200, a situation of selection of a camera performing manual image-capturing, or a situation of operation of the camera performing manual image-capturing.

In a case where there is a plurality of users who perform manual image-capturing, notification of the manual image-capturing recommended camera can be provided in consideration of a situation of another user's selection of manual image-capturing recommended cameras. Specifically, examples of a method of notification of the manual image-capturing recommended camera include a method of not recommending a same camera and a method of eliminating a camera that is capturing images of a subject and scene the same as those manually captured by a camera used by another user from the recommended cameras. In this case, there can be a plurality of multi-camera control apparatuses 140, and respective manual image-capturing recommended camera identification units 404 or respective manual image-capturing recommended camera priority determination units 701 can cooperate with one another. Only notification control units 405 can be arranged in plural.

According to the present disclosure, it is possible to switch to manual image-capturing depending on an automatic image-capturing status of a camera that is performing automatic image-capturing.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While exemplary embodiments have been described, these embodiments are not seen to be limiting. The scope of the following claims is to be accorded the broadest interpretation so as to encompass all such modifications and equivalent structures and functions.

This application claims the benefit of Japanese Patent Application No. 2021-085776, filed May 21, 2021, which is hereby incorporated by reference herein in its entirety.

What is claimed is:

1. A control apparatus configured to acquire images from a plurality of cameras performing control so that a subject is at a predetermined position of a captured image by tracking the subject and performing automatic image-capturing, the control apparatus comprising:
    at least one memory storing instructions; and
    at least one processor that, upon execution of the instructions, is configured to:
    acquire a status of the automatic image-capturing of each of the plurality of cameras, the automatic image-capturing status including information about a current automatic image-capturing target;
    identify based on the acquired automatic image-capturing status, a camera from among the plurality of cameras for which manual image-capturing by a user is recommended; and
    perform control to provide notification based on a result of the identification.

2. The control apparatus according to claim 1, wherein the at least one processor is configured to identify a camera, whose acquired automatic image-capturing status is not equal to a predetermined ideal automatic image-capturing status, as a manual image-capturing recommended camera.

3. The control apparatus according to claim 1, wherein the at least one processor is to acquire an automatic image-capturing policy including at least one of an ideal automatic image-capturing status instructed to each of the plurality of cameras or a degree of importance of a subject, and
    identify, based on the acquired automatic image-capturing policy, a camera for which manual image-capturing is recommended.

4. The control apparatus according to claim 3, wherein the at least one processor is configured to identify a camera, whose current acquired automatic image-capturing status is not equal to the acquired ideal automatic image-capturing status, as a manual image-capturing recommended camera.

5. The control apparatus according to claim 1,
wherein the at least one processor is configured to acquire an automatic image-capturing policy,
determine, based on the acquired image-capturing policy, a priority of a recommended camera is identified, and
provide notification based on a result of the determination.

6. The control apparatus according to claim 1, wherein the at least one processor is configured to determine a manual image-capturing recommended scene of an image-capturing target, and
identify a camera that is capturing images of a scene determined as a recommended scene as the manual image-capturing recommended camera.

7. The control apparatus according to claim 1, wherein the automatic image-capturing status includes information regarding an image-capturing composition of the current automatic image-capturing target.

8. A method for acquiring images from a plurality of cameras performing control so that a subject is at a predetermined position of a captured image by tracking the subject and performing automatic image-capturing, the method comprising:
acquiring a status of the automatic image-capturing of each of the plurality of cameras, the automatic image-capturing status including information about a current automatic image-capturing target;
identifying, based on the acquired automatic image-capturing status, a camera from the plurality of cameras for which manual image-capturing by a user is recommended; and
performing control to provide notification based on a result of the identification.

9. A non-transitory computer-readable recording medium storing a program for causing a computer to execute a method for acquiring images from a plurality of cameras performing control so that a subject is at a predetermined position of a captured image by tracking the subject and performing automatic image-capturing:
acquiring a status of the automatic image-capturing of each of the plurality of cameras, the automatic image-capturing status including information about a current automatic image-capturing target;
identifying, based on the acquired automatic image-capturing status, a camera for which manual image-capturing by a user is recommended; and
performing control to provide notification based on a result of the identification.

\* \* \* \* \*